United States Patent [19]

Kesling, Jr. et al.

[11] Patent Number: 4,851,507

[45] Date of Patent: Jul. 25, 1989

[54] MELT PROCESSABLE ALIPHATIC POLYCARBONATE TERPOLYMERS

[75] Inventors: Haven S. Kesling, Jr., Drexel Hill; Michael J. Cannarsa, Lafayette Hill, both of Pa.; Hsiang-Ning Sun, Houston, Tex.

[73] Assignee: Arco Chemical Technology, Inc., Wilmington, Del.

[21] Appl. No.: 171,054

[22] Filed: Mar. 21, 1988

[51] Int. Cl.$^4$ .............................................. C08G 63/62
[52] U.S. Cl. .................................... 528/405; 528/370
[58] Field of Search ................................ 528/405, 370

[56] References Cited

U.S. PATENT DOCUMENTS

| | | | |
|---|---|---|---|
| 3,706,713 | 12/1972 | Mull et al. | 528/405 X |
| 3,900,424 | 8/1975 | Inoue et al. | 528/393 X |
| 3,953,383 | 4/1976 | Inoue et al. | 528/405 X |
| 4,145,525 | 3/1979 | Dixon et al. | 528/405 X |
| 4,166,898 | 9/1979 | Kambe et al. | 528/405 |
| 4,500,704 | 2/1985 | Kruper et al. | 528/405 |
| 4,665,136 | 5/1987 | Santangelo et al. | 525/523 |
| 4,686,276 | 8/1987 | Myers | 528/405 X |
| 4,763,715 | 8/1988 | Cannarsa et al. | 164/34 X |
| 4,773,466 | 9/1988 | Cannarsa et al. | 164/34 X |

*Primary Examiner*—Earl Nielsen
*Attorney, Agent, or Firm*—Lewis J. Young

[57] ABSTRACT

The addition of a small amount of a second epoxide to the copolymerization of ethylene oxide or propylene oxide with carbon dioxide can give a melt processable polyalkylene carbonate terpolymer which can be processed without extensive thermal decomposition. This invention has particular utility in thermoplastic applications such as injection molding, blow molding, and film manufacture.

14 Claims, No Drawings

MELT PROCESSABLE ALIPHATIC POLYCARBONATE TERPOLYMERS

BACKGROUND OF THE INVENTION

The present invention is directed to polyalkylene carbonate terpolymers which are easily melt processed without extensive thermal degradation.

Polyalkylene carbonates are well known in the art and are easily prepared using a variety of catalysts. Epoxides are known to copolymerize with carbon dioxide, with metal containing catalysts such as zinc diethyl and additives, zinc dicarboxylates, and aluminum porphyrin complexes.

The resulting copolymers have alternating epoxide and carbon dioxide groups, and are polycarbonates. These copolymers have found uses in many areas, such as thermoplastic applications including injection molding, blow molding and film manufacture, ceramic binders, evaporative pattern casting and adhesives. Epoxides shown to proceed readily in this reaction are ethylene oxide, propylene oxide, cyclohexene oxide, cyclopentene oxide, isobutylene oxide, cis-2-butene oxide, and others.

Polyalkylene carbonates, essentially 1:1 molar ratio copolymers between epoxides and carbon dioxide, have many thermoplastic applications which require the polymers to be exposed to heat treatment during melt processing, compounding or modification. Although a simple polypropylene carbonate is not too unstable thermally, it is desirable to make certain modifications rendering it more thermally stable for the purpose of melt processing. Polypropylene carbonate can be melt processed but during processing significant decomposition occurs even in the presence of various stabilizer packages and antioxidants. Decomposition to propylene carbonate monomer occurs by unzipping mechanisms and carbonate linkage scission via hydrolysis readily occur to diminish the properties of the products made during processing. Another desirable feature of the invention would be to increase the temperature window in which the polymer has reasonable melt viscosity to give thermoplastic flow with no significant degradation, thus increasing the processing flexibility of the polymer.

BRIEF SUMMARY OF THE INVENTION

It has now been found that the addition of a second epoxide to the copolymerization reaction of ethylene oxide or propylene oxide with carbon dioxide can significantly increase the decomposition temperature of the resulting terpolymers. This allows the terpolymer to be processed at higher temperatures and/or in a wider temperature window to achieve thermoplastic viscous flow without changes in composition due to thermal degradation. Also, other physical, chemical, and mechanical treatments can be carried out at higher temperatures. Additionally, the terpolymers can be exposed to a given temperature for longer times without incurring excessive decompositions. Without a second epoxide such as cyclohexene oxide, polypropylene carbonate would not be melt processable without extensive decomposition by both chain unzipping and chain scission by hydrolysis. Similarly, copolymer polycyclohexene carbonate is not melt processable without decomposition. Although both copolymers can be melt processed, the polymer mechanical properties are modified by the presence of decomposition products which can act as plasticizers. Unexpectedly, we have found that addition of cyclohexene oxide to the polypropylene carbonate copolymer gives a terpolymer which has a melt processing window between 180° and 230° C. where little or no polymer decomposition occurs. Similar melt processing windows are obtained using other terpolymer epoxide/carbon dioxide combinations.

DETAILED DESCRIPTION OF THE INVENTION

The terpolymers of the invention are prepared by reacting ethylene or propylene oxide with a mixture of two epoxides in a solvent such as dioxane, tetrahydrofuran, methylene chloride or hexane under a pressure of 100 to 700 psig of carbon dioxide using a zinc carboxylate catalyst for up to 40 hours at 25° to 110° C. in accordance with the polymerizations described in either Soga et al, Polymer J. 16, 407 (1981) or Inoue, Makromol. Chem., Rapid Commun. 1, 775 (1980), both of which are hereby incorporated in their entirety herein. Thus, Soga et al teach copolymerization of propylene oxide and carbon dioxide by heating at 60° C. for 40 hours using zinc carboxylate catalysts supported on such materials as silicon dioxide, magnesium oxide and aluminum oxide. Inoue used catalysts prepared by the reaction of zinc oxide with aromatic dicarboxylic acids to polymerize propylene oxide in carbon dioxide at 35° C. for 40 hours.

Preferably, the second epoxide added to the copolymerization of ethylene oxide or propylene oxide with carbon dioxide should increase the Glass Transition Temperature (Tg) of the terpolymer.

In addition to providing a melt processing window with no decomposition, the second epoxide, if correctly chosen, increases the terpolymer Tg. This results in final thermoplastic parts which can be handled with little temperature distortion. Typically, polyethylene carbonate with a 10° C. Tg and polypropylene carbonate with a 40° C. Tg readily undergo temperature distortion. The most preferred second epoxide for this application is cyclohexene oxide which is commercially available. The cyclohexene oxide/carbon dioxide copolymer has a 128° C. Tg while terpolymer prepared from ethylene oxide or propylene oxide with cyclohexene oxide as the second epoxide have Tg's ranging from ambient to 128° C. Thus, the invention provides terpolymer composition that can be processed without degradation and the final thermoplastic polyalkylene carbonate article has a Tg in a commercially useful range. Many other polyethylene carbonate or polypropylene carbonated combinations with second epoxides, which increase the terpolymer Tg and provide melt processability will be obvious to those skilled in the art.

The polyalkylene carbonate terpolymers of the invention will have the formula

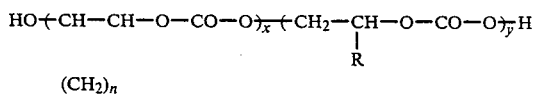

or

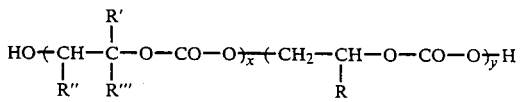

where n is an integer from 3 to 6, x and y are from 5 to 95 and x+y=100, R, R', and R'' are individually H or $CH_3$, R''' is H or $C_1$ to $C_6$ alkyl. It should be pointed out that the instant terpolymers are random in structure and are not the block terpolymers previously known in the art.

Polyalkylene carbonate terpolymers, which have useful thermoplastic melt processing windows with no thermal degradation, are obtained in a broad range of compositions generally between 95 mole percent polyethylene carbonate or polypropylene carbonate/5 mole percent of the second epoxide and 5 mole percent polyethylene carbonate or polypropylene carbonate/95 mole percent of the second epoxide. The preferred composition ranges between a 80/20 and a 10/90 molar ratio between ethylene oxide or propylene oxide and the second epoxide. The second epoxide useful in the invention may be cyclopentene oxide, cyclohexene oxide, cycloheptene oxide, cyclooctene oxide, isobutylene oxide, cis-2-butene oxide, trans-2-butene oxide, and the various amylene oxides. The most preferred polyalkylene carbonate terpolymer is propylene oxide/cyclohexene oxide/carbon dioxide with an epoxide molar ratio ranging between 70/30 to 20/80.

As part of the invention, the propylene oxide/cyclohexene oxide/carbon dioxide terpolymer can be optionally formulated with various known additive packages to improve overall processability and/or stability. Simple additive packages, which are used commercially, give improved processability. A typical package includes calcium stearate. polyethylene wax and an antioxidant. Antioxidants such as hindered phenols, thiobisphenols, amines, thioesters, phosphites and others can be effectively utilized. Other lubricants and additives such as thermal stabilizers, mineral or metal deactivators, mold release agents, antiblocking agents, antifogging agents, antistats, biocides, flame retardants, impact modifiers, UV stabilizers, colorants and fillers can be optionally used. The selection of the additive package is made for each polyalkylene carbonate terpolymer composition on an applications or intended use basis. Concentrations of additives are generally varied within commercially acceptable limits.

The following examples are intended to further illustrate, but not to limit the invention. All parts and percentages are by weight unless otherwise stated.

EXAMPLE I

To a 500 ml stainless steel autoclave reactor with probes for temperature, pressure, and heat demand was added 27 parts of propylene oxide, 3 parts of cyclohexene oxide, 60 parts of hexane and carbon dioxide and the mixture was polymerized according to the method described in Soga et al. The terpolymer was precipitated by adding methanol and dried in vacuo. The polymer composition was determined by Nuclear Magnetic Resonance and Infrared spectroscopies to be at least 99% pure terpolymer. The glass transition temperature (Tg) of the polymer was 38.1° C. and the thermogravimetric analysis (TGA) showed that the dried polymer started to decompose at 246° C. with the peak decomposition at 261° C.

EXAMPLE II-IX

Examples II through IX were prepared by the same procedure as in Example I. In these examples methylene chloride was used as the polymerization solvent. Other solvents and catalysts combinations as outlined by Soga and Inoue give equally good results in the terpolymerization. Properties of the terpolymers formed are shown in Table I.

TABLE I

| Example | PO (g) | CHO (g) | Tg (°C.) | TGA (°C.) Onset | TGA (°C.) Peak |
|---|---|---|---|---|---|
| II | — | 30.0 | 128 | 294 | 311 |
| III | 3.0 | 27.0 | 121 | 278 | 291 |
| IV | 7.5 | 22.5 | 110 | 279 | 289 |
| V | 15.0 | 15.0 | 47/99 | 278 | 288 |
| VI | 18.0 | 12.0 | 47 | 261 | 278 |
| VII | 22.5 | 7.5 | 43 | 254 | 267 |
| VIII | 22.5 | 7.5 | 44 | 254 | 268 |
| IX | 30.0 | — | 40 | 231 | 246 |

PO = propylene oxide; CHO = cyclohexene oxide

TGA decomposition conducted in air.

It can be seen from the data in Table I that the addition of small amounts of cyclohexene oxide to a propylene oxide polymer increases the thermal stability of the parent polymer. The copolymers of Example II and IX are shown in subsequent examples to have limited melt processing window without decomposition. Although the copolymers are not melt processable, the terpolymers shown in Examples III through VIII can be processed and give typical thermoplastic viscous flow without significant decomposition. Similar results are obtained with terpolymers prepared from propylene oxide/cyclopentene oxide/carbon dioxide, ethylene oxide/cyclohexene oxide/carbon dioxide and ethylene oxide/cyclopentene oxide/carbon dioxide. Other combinations should be obvious to those skilled in the art. These terpolymers have Tg's between 10° and 150° C.

EXAMPLE X-XIII

Attempts to cap the terpolymer with cyclohexene oxide by adding the oxide at various times after the reaction had started gave physical mixtures of the two copolymers instead of the terpolymers. The mole ratio of PO to CHO was 77 to 23. Results are shown in Table II.

TABLE II

| Example | Time (Min) | Tg (°C.) | TGA (°C.)[a] |
|---|---|---|---|
| X | 120 | 41.9/110.0 | 258.2/330 |
| XI | 60 | 41.2/92.0 | 237.3[b] |
| XII | 30 | 40.0/81.0 | 250.7/278 |
| XIII | 15 | 50.0/78.1 | 252.6[b] |

[a]Decomposition temperature maximums.
[b]There is a small shoulder at higher temperature.

EXAMPLE XIV

A Rheometric Mechanical Spectrometer (RMS) processing analysis at a 1 sec$^{-1}$ shear rate was made for a polypropylene carbonate copolymer which had a 50K $M_n$ and a 40° C. Tg. The sample was dried in vacuo to minimize hydrolysis during the evaluation. Results indicate the copolymer has stable melt visco-elastic values over the temperature range 125° to 160° C. At these lower temperatures, the Tan Delta values(G''/G') are less than 1.0, indicating an elastic melt or very poor flow. At higher than 160° C., the rheological values shift indicating the resin is beginning to degrade. Results show this polymer has limited melt processing window without extensive degradation. ASTM D1238 Melt Indices studies in Table III also show rapid decomposition above 160° C.

TABLE III

| Temp. (°C.) | Time (Min.) | $MI_2$ | $MI_{10}$ | $MI_{10}/MI_2$ |
| --- | --- | --- | --- | --- |
| 165 | 0 | .66 | 6.9 | 10.4 |
| 165 | 35 | .73 | 12.2 | 16.7 |
| 175 | 0 | .88 | 9.0 | 10.2 |
| 175 | 20 | .95 | 18.6 | 19.6 |

$MI_2$ = Extrudate weight, gram/10 min. @ 2160 grams.
$MI_{10}$ = Extrudate weight, gram/10 min. @ 10,000 grams.

EXAMPLE XV

A study was conducted to determine if polypropylene carbonate could be formulated with various additives and stabilizers to significantly improve the ability to melt process without copolymer decomposition. The following test procedures using a Torque Rheometer produced a reasonable representation of the time to fuse, processing energy and long term stability of polypropylene carbonate polymers.

The experimental procedure is as follows. The mixing chamber is charged to a slight excess volume capacity at 80 grams charge weight. A 15 Kg ram force is applied to compact the material into the chamber during fusion and to maintain pressure during extended mixing. The rheometer is operated at 160° C. and 64 rpm's. After a 3 minute pre-heat, the primary processing parameters are recorded as a torque on the rheometer load cell. The time to reach maximum torque (i,e, fusion time), an equilibrium torque, and the stability of the equilibrium torque are measured and are reported in Table IV.

Improved processability would be reflected by longer fusion times restricting the time exposure to high temperature and shear rate conditions during processing which in turn minimizes degradation. Lowered maximum torque readings indicate that less processing energy is transferred to the polymer melt which is another indication that degradation should be reduced and less processing energy is expended. Equilibrium torques are proportional to the melt viscosity of the fluxed polymer melt and correlate with the magnitude of processing energy required. The temperature rise in the molten polymer mass is an indication of the shear heating experience by the processing conditions and compound formulary. In general, the less shear heating implies a broader range of processability. The constancy of the equilibrium torque is a measure of the thermal stability of the polymer. For polypropylene carbonate polymers, thermal instability is evidenced by a continuous and linear decrease in torque as the unzipping degradation produced an in-situ plasticizer, propylene carbonate monomer, to depress the melt viscosity. For all the polypropylene carbonate formulations tested in Table IV below, the degradation rate is constant and linear during the 30 minute test irrespective of lubricant, test temperature (i.e. 120° C. and 160° C. are identical), or antioxidants which were unchanged from the control polypropylene carbonate base polymer with no processing package. The rate of degradation was not catalytic but consistently linear over extended time periods as expected from a backbone unzipping mechanism. The inherent thermal instability of the polyalkylene carbonate backbone was not altered by any of the compound formularies tested even though the processability profile was improved. Given a stable polymer backbone, a simple calcium stearate/polyethylene wax/antioxidant package improves processability. This type of processing package improves processability of polypropylene carbonate, but does not alter the degradation profile. A package of this type can optionally be utilized to improve terpolymer processability since these materials do not degrade within their processing temperature window.

TABLE IV

| Formulation No. | 1 | 2 | 3 | 4 | 5 | 6 | 7 |
| --- | --- | --- | --- | --- | --- | --- | --- |
| $PO/CO_2$ (Parts) | 100 | 100 | 100 | 100 | 100 | 100 | 100 |
| Lubricants (phr) | | | | | | | |
| Calcium Stearate | 0 | 0.8 | 0.5 | 0.5 | 0.5 | 0.5 | 0.8 |
| Paraffin wax | 0 | 1.2 | 1.5 | 0 | 0 | 0 | 1.2 |
| Polyethylene Wax | 0 | 0.15 | 0.3 | 1.0 | 1.0 | 1.0 | 0.15 |
| Stabilizer (phr) | | | | | | | |
| Hindered Phenol | 0 | 0 | 0 | 0 | 0.1 | 0.25 | 0 |
| Results | | | | | | | |
| Fusion time (sec) | 6 | 38 | 50 | 72 | 120 | 18 | 10 |
| Max. Torque (M-g) | 2670 | 1300 | 1230 | 930 | 1470 | 1470 | 1330 |
| Equil. Torque(") | 870 | 920 | 900 | 900 | 840 | 810 | 1330 |
| Max. Temp.(°C.) | 180 | 175 | 175 | 178 | 178 | 178 | 155 |

EXAMPLE XVI

Rheological scans were made on the RMS for dry polycyclohexene carbonate which has a 45K $M_n$ and a 128° C. Tg. The accumulated data was replotted to show the viscosity and Tan Delta(G''/G') as a function of processing temperature. All data was collected at a 1.0 sec$^{-1}$ shear rate. When the Tan Delta values are less than 1.0, this indicated an elastic melt or poor flow. The RMS on-line plot of viscosity vs. shear rate was taken as temperature was stepped from 168° to 250° C. in 5° C. increments. At the low temperature range of 168°–203° C., there is very little viscous flow character. At higher temperatures above 203° C., the curvature of the viscosity curve is convex and indicates the presence of a yield stress (i.e. infinite viscosity at very low shear rates). The viscosity and Tan Delta values at 1.0 sec.$^{-1}$ show the highly elastic nature of the polycyclohexene carbonate copolymer. At no temperature does the Tan Delta value exceed 1.0. The Tan Delta values drop off beyond 208° C. which indicates there does not appear to be any processing window for this polymer without experiencing decomposition during processing.

EXAMPLE XVII

Rheological scans were made on the RMS for dry 70:30 molar cyclohexene oxide/propylene oxide/carbon dioxide terpolymer which has a 41K $M_n$ and a 110° C. Tg. The accumulated data was replotted to show the viscosity and Tan Delta as a function of processing temperature. All data was collected at a 1.0 sec$^{-1}$ shear rate. When the Tan Delta values are less than 1.0 this indicates an elastic melt or poor flow. The RMS on-line plot of viscosity vs. shear rate was taken as temperature was stepped from 170° to 250° C. in 5° C. increments. At low temperatures of less than 190° C., the slope is nearly a straight line with elastic response (i.e. Tan Delta values less than 1.0). The viscosity plots between 190° and 220° C. have the expected curvature for viscous flow and a melt processable thermoplastic. Beyond 220° C., the viscosity values are scattered and indicate the onset of sample degradation. Also above about 240° C., the sample showed signs of foaming which indicates extensive decomposition. Results show that these terpolymers give a 20° to 30° C. melt processing window without decomposition. Stability at 190° C. is further demonstrated by ASTM D1238 Melt Index studies which show stability. Based on results for polypropylene carbonate and polycyclohexene carbonate copolymers, a melt processing window with no decomposition for the terpolymer is unexpected and is the basis of our invention.

TABLE V

| Temp (°C.) | Time (min.) | MI$_2$ | MI$_{10}$ | MI$_{10}$/MI$_2$ |
|---|---|---|---|---|
| 190 | 0 | .091 | 2.55 | 28.3 |
| 190 | 45 | .10 | 2.90 | 29.0 |

Even after 45 minutes at 190° C., the terpolymer shows a fairly stable Melt Index profile indicating no decomposition. Similar results were obtained for other cyclohexene oxide/propylene oxide/carbon dioxide terpolymer which are prepared at different molar ratios. Other terpolymer combinations which can be melt processed are obvious to those skilled in the art.

We claim:

1. A thermoplastic polyalkylene carbonate random copolymer of carbon dioxide and a mixture of epoxides able to be melt-processed without significant degradation, wherein said mixture of epoxides is comprised of
   (a) from about 5 to 95 mole percent based on total epoxide of propylene oxide, and
   (b) from about 5 to 95 mole percent based on total epoxide of a second epoxide selected from the group consisting of epoxides having the structural formula

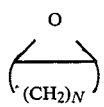

where n is an integer from 4 to 6 and epoxides having the structural formula

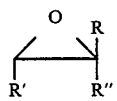

where R and R' are H or CH$_3$, R" is H or C$_1$ to C$_6$ linear or branched alkyl, and wherein no more than one of R, R', and R" is H.

2. The thermoplastic polyalkylene carbonate random copolymer of claim 1 wherein said mixture of epoxides is comprised of from about 10 to 80 mole percent propylene oxide and from about 20 to 90 mole percent of said second epoxide.

3. The thermoplastic polyalkylene carbonate random copolymer of claim 1 wherein said mixture of epoxides is comprised of from about 20 to 70 mole percent propylene oxide and from about 30 to 80 mole percent of said second epoxide.

4. The thermoplastic polyalkylene carbonate random copolymer of claim 1 having a glass transition temperature between the glass transition temperature of a copolymer of carbon dioxide and propylene oxide and the glass transition temperature of a copolymer of carbon dioxide and said second epoxide.

5. The thermoplastic polyalkylene carbonate random copolymer of claim 1 wherein said second epoxide is cyclohexene oxide.

6. The thermoplastic polyalkylene carbonate random copolymer of claim 1 wherein said second epoxide is cycloheptene oxide.

7. The thermoplastic polyalkylene carbonate random copolymer of claim 1 wherein said second epoxide is isobutylene oxide.

8. The thermoplastic polyalkylene carbonate random copolymer of claim 1 wherein said second epoxide is cis-2-butene oxide.

9. The thermoplastic polyalkylene carbonate random copolymer of claim 1 wherein said second epoxide is 2-methyl-2-butene oxide.

10. The thermoplastic polyalkylene carbonate random copolymer of claim 1 wherein said mixture of epoxides is comprised of from about 20 to 70 mole percent propylene oxide and from about 30 to 80 mole percent cyclohexene oxide.

11. A method of preparing a thermoplastic polyalkylene carbonate random copolymer able to be melt-processed without significant degradation which comprises co-polymerizing in the presence of a catalyst carbon dioxide and a mixture of epoxides, wherein said mixture is comprised of
    (a) from about 5 to 95 mole percent based on total epoxide propylene oxide, and
    (b) from about 5 to 95 mole percent based on total epoxide of a second epoxide selected from the group consisting of epoxides having the structural formula

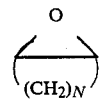

where n is an integer from 4 to 6 and epoxides having the structural formula

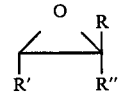

where R and R' are H or CH$_3$, and R' is H or C$_1$ to C$_6$ linear or branched alkyl and wherein no more than one of R, R', and R" is H.

12. The method of claim 11 wherein said second epoxide is cyclohexene oxide.

13. The method of claim 11 wherein said carbon dioxide, from about 20 to 70 mole percent propylene oxide based on total epoxide, and from about 30 to 80 mole percent cyclohexene oxide based on total epoxide, are copolymerized.

14. The method of claim 11 wherein the catalyst is a zinc carboxylate catalyst.

* * * * *